(12) United States Patent
Mao

(10) Patent No.: US 9,991,779 B2
(45) Date of Patent: Jun. 5, 2018

(54) HARMONIC REDUCTION APPARATUS FOR WIRELESS POWER TRANSFER SYSTEMS

(71) Applicant: NuVolta Technologies, Milpitas, CA (US)

(72) Inventor: Hengchun Mao, Allen, TX (US)

(73) Assignee: NuVolta Technologies, Milpitas, CA (US)

( * ) Notice: Subject to any disclaimer, the term of this patent is extended or adjusted under 35 U.S.C. 154(b) by 507 days.

(21) Appl. No.: 14/590,908

(22) Filed: Jan. 6, 2015

(65) Prior Publication Data

US 2015/0194811 A1    Jul. 9, 2015

Related U.S. Application Data

(60) Provisional application No. 61/964,526, filed on Jan. 7, 2014.

(51) Int. Cl.
H01F 27/42    (2006.01)
H01F 37/00    (2006.01)
H01F 38/00    (2006.01)
H02M 1/12    (2006.01)
H02J 50/70    (2016.01)
H02J 7/02    (2016.01)
H02M 3/335    (2006.01)
H02J 50/12    (2016.01)

(52) U.S. Cl.
CPC .............. *H02M 1/12* (2013.01); *H02J 7/025* (2013.01); *H02J 50/12* (2016.02); *H02J 50/70* (2016.02); *H02M 3/33523* (2013.01); *Y02B 70/1433* (2013.01)

(58) Field of Classification Search
CPC ........ H02J 7/025; H02J 50/01; Y02B 70/1433; H02M 3/33523; H02M 1/12
See application file for complete search history.

(56) References Cited

U.S. PATENT DOCUMENTS

| 6,472,956 | B2 | 10/2002 | Kosuga |
| 7,764,515 | B2 | 7/2010 | Jansen et al. |
| 8,611,111 | B2 * | 12/2013 | Kim ........................ H02J 17/00 363/34 |
| 2002/0173287 | A1 | 11/2002 | Mitchell Rogers |
| 2007/0082617 | A1 * | 4/2007 | McCallister ......... H04B 1/0475 455/63.1 |
| 2008/0093390 | A1 | 4/2008 | Yu |
| 2008/0231211 | A1 | 9/2008 | Baarman et al. |

(Continued)

OTHER PUBLICATIONS

International Search Report and Written Opinion of Patent Cooperation Treaty (PCT), Application No. PCT/US15/10368, Applicant: Nuvolta Technologies, dated Apr. 8, 2015, 10 pages.

*Primary Examiner* — Jared Fureman
*Assistant Examiner* — Esayas Yeshaw
(74) *Attorney, Agent, or Firm* — Slater Matsil, LLP

(57) ABSTRACT

A device comprises a switch network coupled to a power source, wherein the switch network comprises a plurality of power switches, a transmitter resonant tank coupled to the plurality of power switches, wherein the transmitter resonant tank comprises a primary resonant capacitor, a transmitter coil coupled to the transmitter resonant tank and a harmonic reduction apparatus coupled between the switch network and the transmitter coil, wherein the harmonic reduction apparatus is configured to attenuate at least one undesired frequency component.

20 Claims, 14 Drawing Sheets

(56) References Cited

U.S. PATENT DOCUMENTS

| | | | |
|---|---|---|---|
| 2008/0238364 A1* | 10/2008 | Weber | H02J 7/025 320/108 |
| 2009/0202017 A1* | 8/2009 | Ichihara | H03G 3/004 375/297 |
| 2010/0144402 A1* | 6/2010 | Watanabe | G06K 19/0723 455/572 |
| 2010/0172168 A1 | 7/2010 | Fells | |
| 2011/0009057 A1 | 1/2011 | Saunamaki | |
| 2012/0049647 A1* | 3/2012 | Kim | H02J 5/005 307/104 |
| 2012/0280575 A1* | 11/2012 | Kim | H02J 17/00 307/104 |
| 2013/0062961 A1* | 3/2013 | Park | H02J 50/12 307/104 |
| 2013/0093390 A1 | 4/2013 | Partovi | |
| 2013/0119875 A1* | 5/2013 | Dearborn | H05B 33/0815 315/186 |
| 2013/0265804 A1* | 10/2013 | Fu | H02M 3/33576 363/17 |
| 2014/0062395 A1* | 3/2014 | Kwon | H02J 50/60 320/108 |
| 2014/0285026 A1* | 9/2014 | Hori | H02J 5/005 307/104 |

\* cited by examiner

HARMONIC REDUCTION APPARATUS FOR WIRELESS POWER TRANSFER SYSTEMS

This application claims the benefit of U.S. Provisional Application No. 61/964,526, filed on Jan. 7, 2014, entitled "High Efficiency Power Conversion Techniques with EMC Measures," which application is hereby incorporated herein by reference.

TECHNICAL FIELD

The present invention relates to a harmonic reduction apparatus, and, in particular embodiments, to a harmonic notch and/or a harmonic trap circuit applied to a wireless power transfer system.

BACKGROUND

As technologies further advance, wireless power transfer has emerged as an efficient and convenient mechanism for powering or charging battery based mobile devices such as mobile phones, tablet PCs, digital cameras, MP3 players and/or the like. A wireless power transfer system typically comprises a primary side transmitter and a secondary side receiver. The primary side transmitter is magnetically coupled to the secondary side receiver through a magnetic coupling. The magnetic coupling may be implemented as a loosely coupled transformer having a primary side coil formed in the primary side transmitter and a secondary side coil formed in the secondary side receiver.

The primary side transmitter may comprise a power conversion unit such as a primary side of a power converter. The power conversion unit is coupled to a power source and is capable of converting electrical power to wireless power signals. The secondary side receiver is able to receive the wireless power signals through the loosely coupled transformer and convert the received wireless power signals to electrical power suitable for a load.

In a battery based system such as a mobile phone, the top surface of a transmitter may be implemented as a charging pad. The transmitter coil can be placed underneath the charging pad. The mobile phone may receive power from the charging pad when it is placed near or on the charging pad. In particular, the receiver coil in the mobile phone picks up the power transferred from the transmitter coil through magnetic coupling between these two coils. The distance between the transmitter coil and the receiver coil is in a range from about 1 mm to about 100 mm. A high frequency current in the transmitter is desired in order to transfer power efficiently over a long distance. However, the achievable frequency in a wireless power transfer system is usually limited by the switching losses of the power switches of the wireless power transfer system.

As power consumption has become more important, there may be a need for high power density and high efficiency wireless power transfer systems. Resonant converter based wireless power transfer systems have become the preferred choice for achieving high performance (e.g., lower power losses) because resonant converters are capable of reducing switching losses of power switches through zero voltage switching and/or zero current switching. However, as the frequency of the wireless power transfer system goes higher, the EMI compliance has become a significant issue, which presents challenges to the system design of the wireless power transfer system.

SUMMARY OF THE INVENTION

These and other problems are generally solved or circumvented, and technical advantages are generally achieved, by preferred embodiments of the present invention which reduce noise of a wireless power transfer system.

In accordance with an embodiment, a system comprises a switch network coupled to a power source, wherein the switch network comprises a plurality of power switches, a primary resonant tank coupled to the plurality of power switches, wherein the primary resonant tank comprises at least a resonant capacitor, a transmitter coil coupled to the primary resonant tank, wherein the transmitter coil is configured to be magnetically coupled to a receiver coil and the transmitter coil and receiver coil are configured such that wireless power is transferred from the transmitter coil to the receiver coil and a harmonic reduction apparatus coupled between the switch network and the transmitter coil, wherein the harmonic reduction apparatus is configured to attenuate at least one undesired frequency component of a current in the transmitter coil.

In accordance with another embodiment, a device comprises a switch network coupled to a power source, wherein the switch network comprises a plurality of power switches, a transmitter resonant tank coupled to the plurality of power switches, wherein the transmitter resonant tank comprises a primary resonant capacitor, a transmitter coil coupled to the transmitter resonant tank and a harmonic reduction apparatus coupled between the switch network and the transmitter coil, wherein the harmonic reduction apparatus is configured to attenuate at least one undesired frequency component of a current in the transmitter coil.

In accordance with yet another embodiment, a device comprises a switch network coupled to a power source through an input capacitor, wherein the switch network comprises a plurality of power switches, a transmitter resonant tank coupled to the plurality of power switches, wherein the transmitter resonant tank comprises a primary resonant capacitor, a transmitter coil coupled to the transmitter resonant tank for transferring power to a receiver coil, a harmonic reduction apparatus comprising a plurality of harmonic notch circuits and a plurality of harmonic trap circuits and a soft start switch coupled between the power source and the input capacitor.

An advantage of a preferred embodiment of the present invention is improving a wireless power transfer system's performance through employing a harmonic notch circuit and/or a harmonic trap circuit to prevent harmonic currents (e.g., third order harmonic) from flowing through the transmitter coil of the wireless power transfer system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a harmonic reduction apparatus for a half-bridge resonant converter in a wireless power transfer system. The invention may also be applied, however, to a variety of resonant converters. Hereinafter, various embodiments will be explained in detail with reference to the accompanying drawings.

Figure 1:
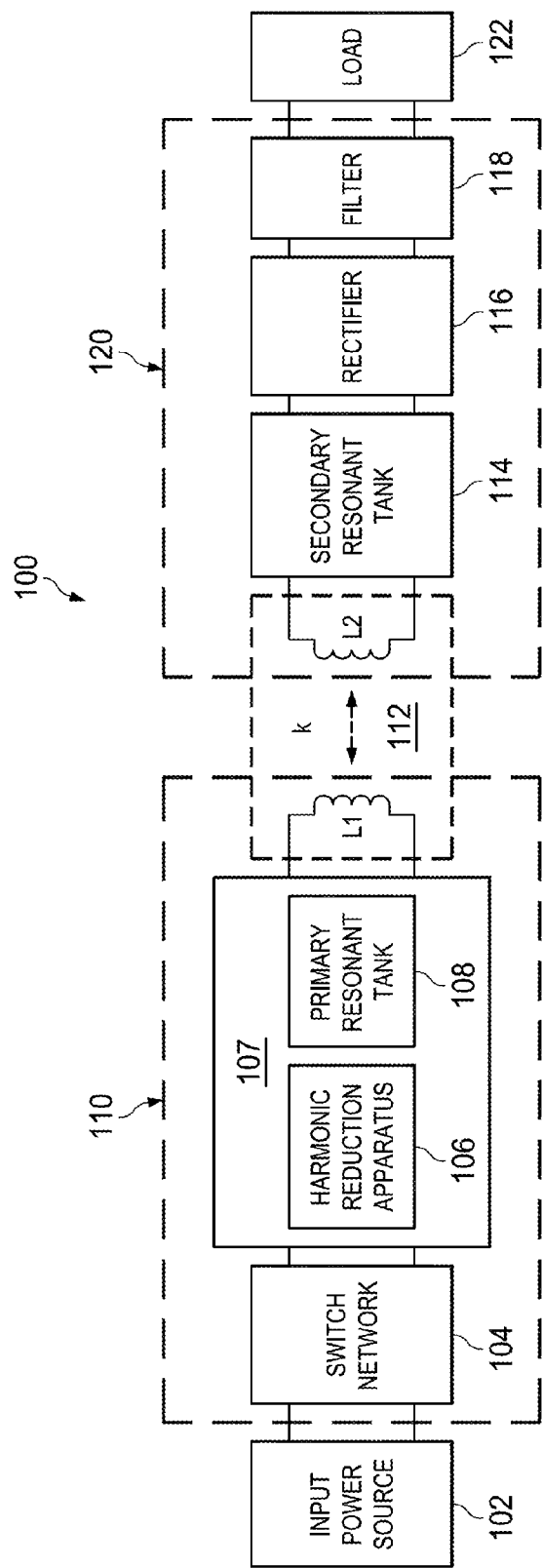
FIG. 1 illustrates a block diagram of a power conversion portion of a wireless power transfer system in accordance with various embodiments of the present disclosure.

FIG. 1 illustrates a block diagram of a power conversion portion of a wireless power transfer system in accordance with various embodiments of the present disclosure. A wireless power transfer system 100 includes a power transmitter 110 and a power receiver 120. As shown in FIG. 1, the input of the power transmitter 110 is coupled to an input power source 102. The output of the power receiver 120 is coupled to a load 122. The power transmitter 110 is magnetically coupled to the power receiver 120 through a magnetic field when the power receiver 120 is placed near the power transmitter 110. A loosely coupled transformer 112 is formed by a transmitter coil in the power transmitter 110 and a receiver coil in the power receiver 120. As a result, power may be transferred from the power transmitter 110 to the power receiver 120. In some embodiments, the power transmitter 110 may be a charging pad. The transmitter coil is placed underneath the top surface of the charging pad. The power receiver 120 may be embedded in a mobile phone. When the mobile phone is place near the charging pad, a magnetic coupling may be established between the transmitter coil and the receiver coil. In other words, the transmitter coil and the receiver coil may form a loosely coupled transformer through which a power transfer occurs between the power transmitter 110 and the power receiver 120. The strength of coupling between the transmitter coil and the receiver coil is quantified by the coupling coefficient k. In some embodiments, k is in a range from about 0.05 to about 0.9.

In some embodiments, after the magnetic coupling has been established between the transmitter coil and the receiver coil, the power transmitter 110 and the power receiver 120 may form a converter through which power is wirelessly transferred from the input power source 102 to the load 122.

The input power source 102 may be a power adapter converting a utility line voltage to a dc voltage. Alternatively, the input power source 102 may be a renewable power source such as a solar panel array. Furthermore, the input power source 102 may be an energy storage device such as rechargeable batteries, fuel cells and/or the like.

The load 122 represents the power consumed by the mobile device (e.g., a mobile phone) coupled to the power receiver 120. Alternatively, the load 122 may refer to a rechargeable battery and/or batteries connected in series/parallel, and coupled to the output of the power receiver 120.

The power transmitter 110 may comprise a switch network 104, a harmonic reduction apparatus 106, a primary resonant tank 108 and a transmitter coil L1. As shown in FIG. 1, the switch network 104 is coupled to the input power source 102. The harmonic reduction apparatus 106 and the primary resonant tank 108 may form an auxiliary network 107. Depending design needs and different applications, the auxiliary network 107 may comprise many different configurations. In some embodiments, the transmitter coil L1 may be part of the primary resonant tank 108. In some embodiments, the harmonic reduction apparatus 106 and the primary resonant tank 108 are connected in series. In some embodiments, the harmonic reduction apparatus 106 is connected between the switch network 104 and the primary resonant tank 108. In alternative embodiments, the harmonic reduction apparatus 106 and the primary resonant tank 108 are connected in parallel. Furthermore, the harmonic reduction apparatus 106 may be placed between a resonant inductor and a resonant capacitor of the primary resonant tank 108. The detailed configurations of the auxiliary network 107 will be described below with respect to FIGS. 2-12.

The switch network 104 may comprise primary side switches of a half-bridge converter according to some embodiments. Alternatively, the switch network 104 may comprise the primary side switches of other converters such as a full-bridge converter, a push-pull converter and the like. The detailed configuration of the switch network 104 will be described below with respect to FIG. 2.

It should be noted that the converters described above are merely examples. One having ordinary skill in the art will recognize other suitable power converters such as class E topology based power converters (e.g., a class E amplifier), may alternatively be used.

The harmonic reduction apparatus 106 may comprise at least one inductor and one capacitor. In some embodiments, the inductor and the capacitor of the harmonic reduction apparatus 106 may be connected in series to form a series resonant circuit. Such a series resonant circuit is alternatively referred to as a harmonic notch circuit because it forms a low impedance path for a harmonic component having a frequency equal to the resonant frequency of the series resonant circuit. Alternatively, the inductor and the capacitor of the harmonic reduction apparatus 106 may be connected in parallel to form a parallel resonant circuit. Such a parallel resonant circuit is alternatively referred to as a harmonic trap circuit because it forms a high impedance path for a harmonic component having a frequency equal to the resonant frequency of the parallel resonant circuit. Furthermore, the harmonic reduction apparatus 106 may comprise a resistor. The resistor may be formed by the equivalent resistance of the harmonic reduction apparatus 106. Alternatively, the resistor may be implemented as a discrete resistor. Furthermore, the resistor may be formed by a combination of the equivalent resistance and the discrete resistor. The detailed structures of the harmonic reduction apparatus 106 will be described below with respect to FIGS. 2-12.

The primary resonant tank 108 may comprise a series resonant circuit, a parallel resonant circuit and/or a series-parallel resonant circuit. In some embodiments, the primary resonant tank 108 may comprise a first series resonant inductor, the transmitter coil L1 and a first series resonant capacitor (not shown but illustrated in FIG. 2). The primary resonant tank 108 may be optional. For example, the first series resonant inductor may be implemented as an external inductor. Alternatively, the first series resonant inductor may be implemented as a connection wire.

The power receiver 120 comprises the receiver coil magnetically coupled to the transmitter coil after the power receiver 120 is placed near the power transmitter 110. As a result, power may be transferred to the receiver coil and further delivered to the load 122 through the secondary resonant tank 114, the rectifier 116 and the output filter 118. As shown in FIG. 1, the secondary resonant tank 114, the rectifier 116 and the output filter 118 are connected in cascade between the receiver coil and the load 122.

The secondary resonant tank 114 may be of a structure similar to that of the primary resonant tank 108. For simplicity, the structure of the secondary resonant tank 114 is not described in detail herein.

The rectifier 116 converts an alternating polarity waveform received from the output of the receiver coil to a single polarity waveform. In some embodiments, the rectifier 116 comprises a pair of diodes. In alternative embodiments, the rectifier may comprise a pair of switching elements such as n-type metal oxide semiconductor (NMOS) transistors.

Furthermore, the rectifier 116 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the rectifier 116 are well known in the art, and hence are not discussed herein.

The output filter 118 is used to attenuate the switching ripple of the wireless power transfer system 100. According to the operation principles of isolated dc/dc converters, the output filter 118 may be an L-C filter formed by an inductor and a plurality of capacitors. One person skilled in the art will recognize that some isolated dc/dc converter topologies such as forward converters may require an L-C filter. On the other hand, some isolated dc/dc converter topologies such as resonant converters may include an output filter formed by a capacitor. One person skilled in the art will further recognize that different output filter configurations apply to different power converter topologies as appropriate. The configuration variations of the output filter 118 are within various embodiments of the present disclosure.

Figure 2:
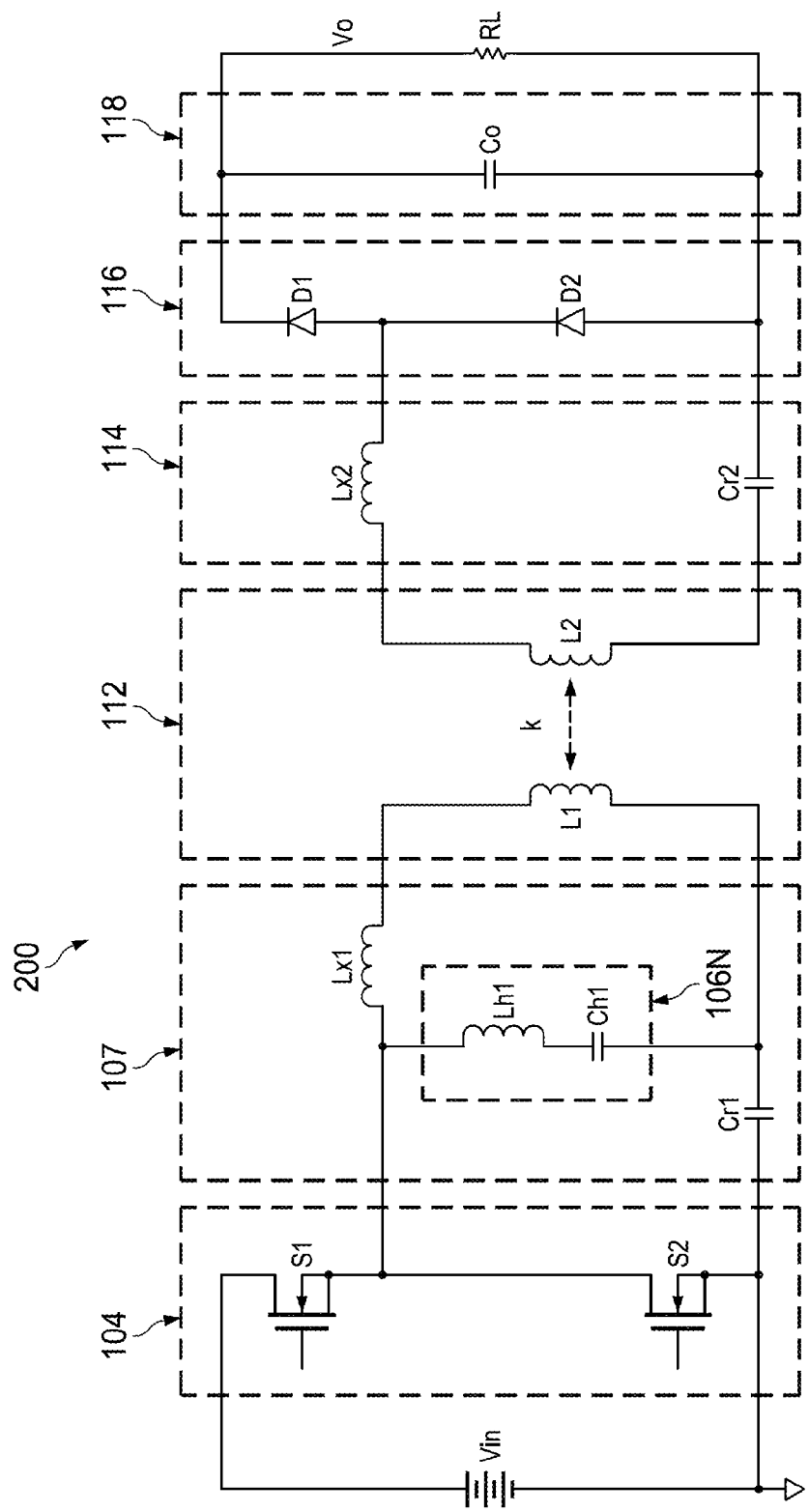
FIG. 2 illustrates a schematic diagram of a first illustrative implementation of the harmonic reduction apparatus of the wireless power transfer system shown in FIG. 1 in accordance with various embodiments of the present disclosure.

FIG. 2 illustrates a schematic diagram of a first illustrative implementation of the harmonic reduction apparatus of the wireless power transfer system shown in FIG. 1 in accordance with various embodiments of the present disclosure. The switch network 104 includes two switching elements, namely S1 and S2. As shown in FIG. 2, the switching elements S1 and S2 are connected in series between two terminals of the input dc power source VIN. The common node of the switching elements S1 and S2 is coupled to a first input terminal of the auxiliary network 107. The source of the switching element S2 is connected to ground and further connected to a second input terminal of the auxiliary network 107. The output terminals of the auxiliary network 107 are connected to two terminals of the transmitter coil L1 respectively as shown in FIG. 2.

The switching elements S1 and S2 form a primary side switching network of a half-bridge resonant converter. According to some embodiments, the switching elements S1 and S2 are implemented as MOSFET or MOSFETs connected in parallel, any combinations thereof and/or the like.

According to alternative embodiments, the switching elements (e.g., switch S1) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the example throughout the description is based upon a half-bridge resonant converter (e.g., half-bridge resonant converter shown in FIG. 2), the resonant converter 200 shown in FIG. 2 may have many variations, alternatives, and modifications. For example, full-bridge converters, push-pull converters, class E based power converters (e.g., a class E amplifier) may be alternatively employed. Furthermore, an LLC resonant converter may be formed when the transmitter coil L1 is tightly coupled with the receiver coil L2 in some applications.

In sum, the half-bridge resonant converter 200 illustrated herein is limited solely for the purpose of clearly illustrating the inventive aspects of the various embodiments. The present invention is not limited to any particular power topology.

It should further be noted that while FIG. 2 illustrates two switches S1 and S2, various embodiments of the present disclosure may include other variations, modifications and alternatives. For example, a separate capacitor may be connected in parallel with each switch of the switching network 104. Such a separate capacitor helps to better control the timing of the resonant process of the half-bridge resonant converter 200.

The primary resonant tank of the half-bridge resonant converter 200 is formed by a first series resonant inductor Lx1, a first series resonant capacitor Cr1 and the transmitter coil L1. As shown in FIG. 2, the first resonant inductor Lx1, the first resonant capacitor Cr1 and the transmitter coil L1 are connected in series. It should be noted the primary resonant tank shown in FIG. 2 is merely an example. There may be many variations, alternative and modifications. For example, additional resonant capacitors and/or resonant inductors may be employed in the primary resonant tank. Furthermore, while FIG. 2 shows the resonant elements of the primary resonant tank are connected in series, other connection configurations such as parallel connections, parallel-series connections are within the scope of this disclosure.

The first implementation of the harmonic reduction apparatus 106 (shown in FIG. 1) is a harmonic notch circuit formed by an inductor Lh1 and a capacitor Ch1 connected in series. Throughout the description, the harmonic notch circuit shown in FIG. 2 is alternatively referred to as the harmonic notch circuit 106N.

As shown in FIG. 2, the harmonic notch circuit 106N has a first terminal connected to a common node of the switching elements S1 and S2. The second terminal of the harmonic notch circuit 106N is connected to a common node of the first resonant capacitor Cr1 and the transmitter coil L1.

It should be noted, depending on design needs and different applications, the harmonic notch circuit 106N may comprise a resistor (not shown) connected in series with the inductor Lh1 and the capacitor Ch1. The resistor may be formed by the equivalent resistance of the inductor Lh1 and the capacitor Ch1. In alternative embodiments, the resistor may be implemented as a discrete resistor.

In operation, the values of the inductor Lh1 and the capacitor Ch1 are selected such that the inductor Lh1 and the capacitor Ch1 form a low impedance path for an undesired frequency component. In some embodiments, the switch network 104 operates at a switching frequency of 6.78 MHz. The harmonic notch circuit 106N is designed to attenuate the third order harmonic having a frequency of about 20.34 MHz. In other words, the inductor Lh1 and the capacitor Ch1 form a low impedance path for the third order harmonic so that the third order harmonic current is diverted into the low impedance path.

In some embodiments, the inductance of Lh1 is in a range from about 1 nH to about 100 nH. The capacitor of Ch1 is in a range from about 10 pF to about 100 nF. It should be noted that the values given above are selected purely for demonstration purposes and are not intended to limit the various embodiments of the present invention to any particular values. A person skilled in the art will recognize that, depending on different application and design needs, the inductance and capacitance recited above may be changed to different values.

One advantageous feature of the harmonic notch circuit 106N shown in FIG. 2 is that the harmonic notch circuit 106N is capable of attenuating unwanted harmonics (e.g., the third order harmonic). As a result, the current flowing through the transmitter coil is of a sinusoidal waveform. Such a sinusoidal waveform helps the wireless power transfer system satisfy the EMC regulations.

The secondary resonant tank 114 comprises a second series resonant inductor Lx2, the receiver coil L2 and a second series resonant capacitor Cr2. As shown in FIG. 2, the second resonant inductor Lx2, the receiver coil L2 and the second resonant capacitor Cr2 are connected in series. It should be noted the secondary resonant tank 114 shown in FIG. 2 is merely an example. There may be many variations, alternative and modifications. For example, additional resonant capacitors and/or resonant inductors may be employed in the secondary resonant tank 114. Furthermore, while FIG. 2 shows the resonant elements of the secondary resonant tank 114 are connected in series, other connection configurations such as parallel connections, parallel-series connections are within the scope of this disclosure.

The outputs of the secondary resonant tank 114 are coupled to the load RL through the rectifier 116, which is formed by diodes D1 and D2. As shown in FIG. 2, diodes D1 and D2 are connected in series and further coupled between two terminals of the load RL.

It should be noted the rectifier structure shown in FIG. 2 is merely an example. One person skilled in the art will recognize many alternatives, variations and modification. For example, the diodes D1 and D2 may be replaced by two switches.

Figure 3:
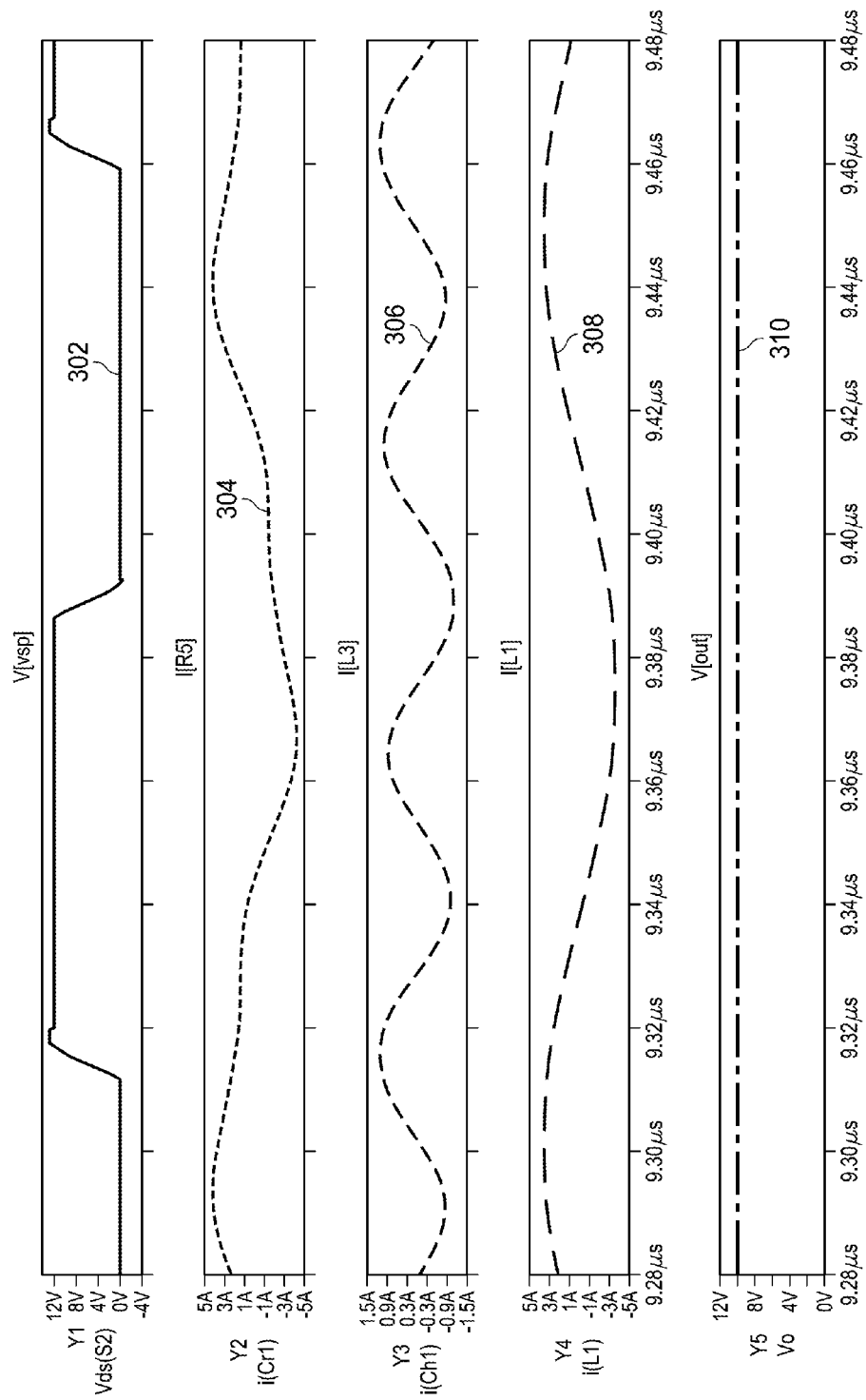
FIG. 3 illustrates waveforms of the wireless power transfer system shown in FIG. 2 in accordance with various embodiments of the present disclosure.

FIG. 3 illustrates various waveforms of the wireless power transfer system shown in FIG. 2 in accordance with various embodiments of the present disclosure. The horizontal axis of FIG. 3 represents intervals of time. The unit of the horizontal axis is micro second. There may be five vertical axes. The first vertical axis Y1 represents the voltage across the drain-to-source of the switch S2. The second vertical axis Y2 represents the current flowing through the first series resonant capacitor Cr1. The third vertical axis Y3 represents the current flowing through the capacitor Ch1. The fourth vertical axis Y4 represents the current flowing through the transmitter coil L1. The fifth vertical axis Y5 represents the output voltage of the wireless power transfer system 200.

As shown in FIG. 3, waveform 310 indicates the output voltage Vo is maintained at a desired value. Waveform 308 shows the current flowing through the transmitter coil L1 has a sinusoidal waveform. In other words, the third order harmonic content of the waveform 308 is relatively low because the third order harmonic has been diverted into the harmonic notch circuit comprising Ch1 and Lh1 (shown in FIG. 2).

Waveform 302 shows the switching frequency of the wireless power transfer system 200. Furthermore, waveform 302 indicates that both S1 and S2 have a zero voltage turn-on transition. Waveform 306 shows the current flowing through the harmonic notch circuit is mainly the third order harmonic current. Waveform 304 shows the current flowing through the first series resonant capacitor Cr1 is a combination of a third order harmonic waveform and a fundamental frequency waveform.

Figure 4:
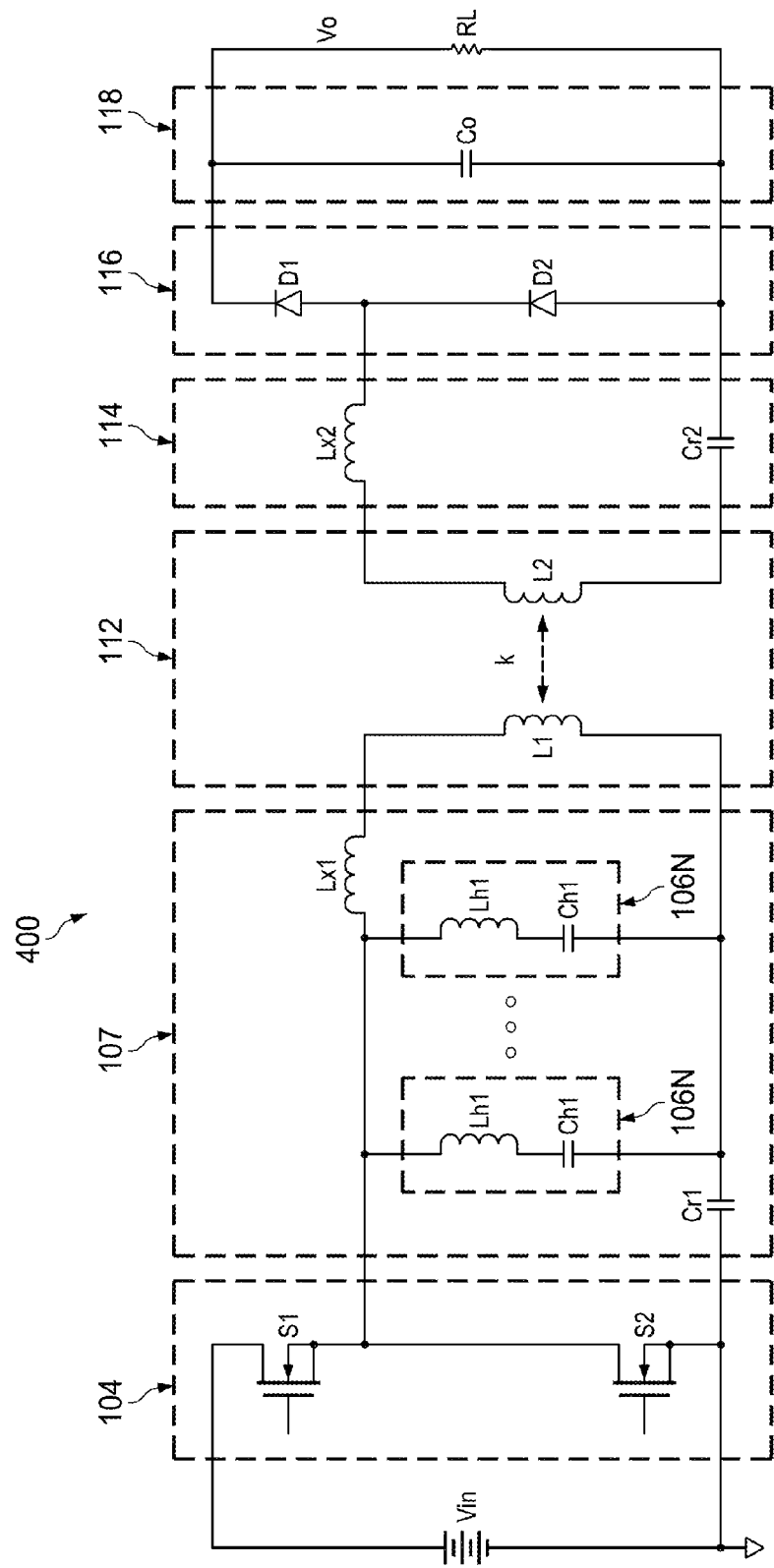
FIG. 4 illustrates a schematic diagram of a second illustrative implementation of the harmonic reduction apparatus shown in FIG. 1 in accordance with various embodiments of the present disclosure.

FIG. 4 illustrates a schematic diagram of a second illustrative implementation of the harmonic reduction apparatus shown in FIG. 1 in accordance with various embodiments of the present disclosure. The structures and operation principles of the switching network 104, the primary resonant tank, the loosely coupled transformer 112, the secondary resonant tank 114, the rectifier 116 and the output filter 118 are similar to those shown in FIG. 2, and hence are not discussed again to avoid repetition. The harmonic reduction apparatus of the wireless power transfer system 400 shown in FIG. 4 is formed by a plurality of harmonic notch circuits 106N connected in parallel. In some embodiments, each harmonic notch circuit 106N shown in FIG. 4 may be designed to attenuate an odd order harmonic. As a result, multiple odd order harmonics are diverted into the harmonic reduction apparatus.

Figure 5:
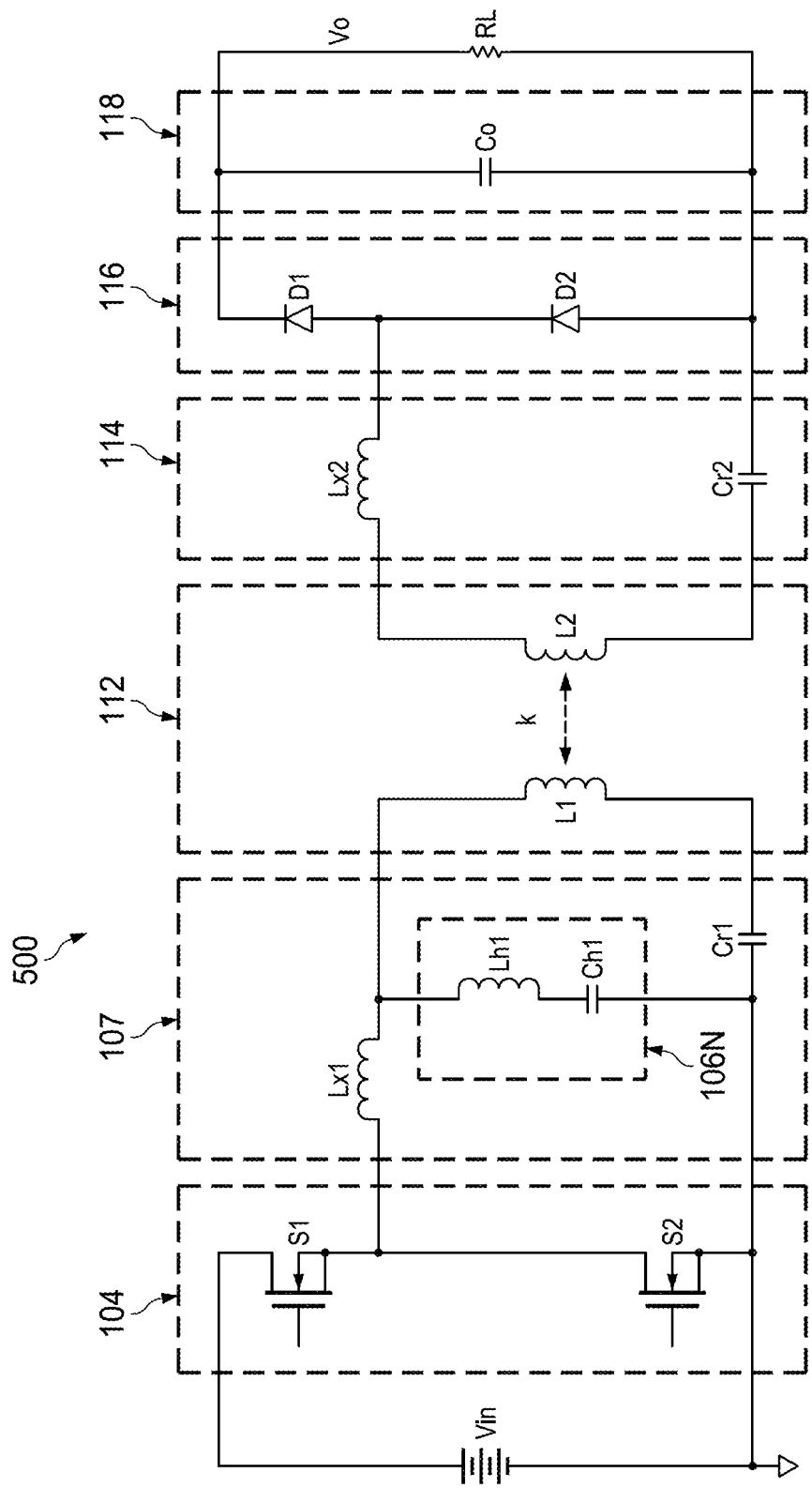
FIG. 5 illustrates a schematic diagram of a third illustrative implementation of the harmonic reduction apparatus shown in FIG. 1 in accordance with various embodiments of the present disclosure.

FIG. 5 illustrates a schematic diagram of a third illustrative implementation of the harmonic reduction apparatus shown in FIG. 1 in accordance with various embodiments of the present disclosure. The structure of the wireless power transfer system 500 is similar to that shown in FIG. 2 except that the location of the harmonic notch circuit 106N is different. More particularly, a first terminal of the harmonic notch circuit 106N is connected to a common node of the first resonant inductor Lx1 and the transmitter coil L1. A second terminal of the harmonic notch circuit 106N is connected to ground. One advantageous feature of the configuration shown in FIG. 5 is the first resonant inductor Lx1 may help to reduce the harmonic component. In other words, the first resonant inductor Lx1 may function as a filter element to further reduce the harmonic content of the wireless power transfer system 500.

Figure 6:
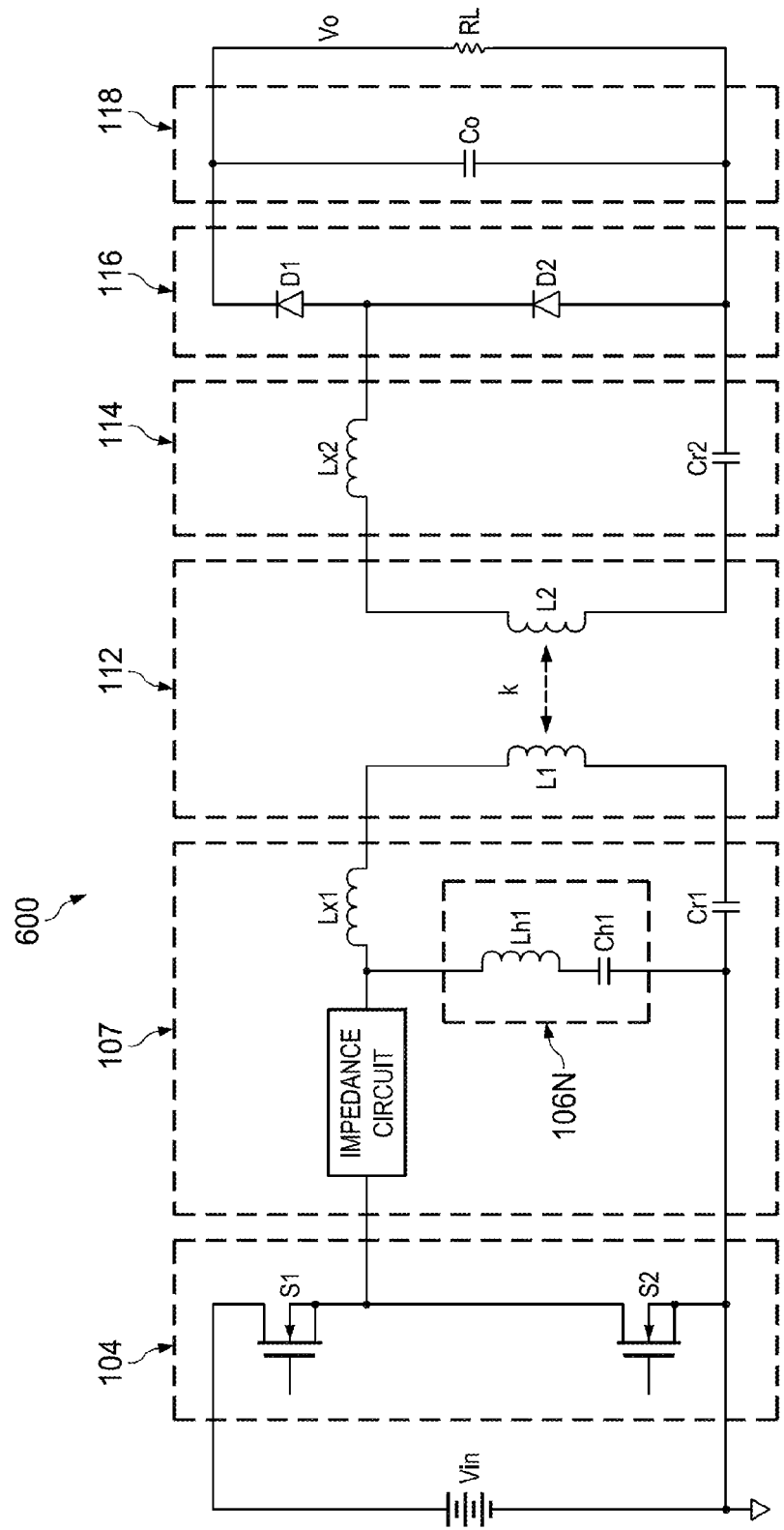
FIG. 6 illustrates a schematic diagram of a fourth illustrative implementation of the harmonic reduction apparatus shown in FIG. 1 in accordance with various embodiments of the present disclosure.

FIG. 6 illustrates a schematic diagram of a fourth illustrative implementation of the harmonic reduction apparatus shown in FIG. 1 in accordance with various embodiments of the present disclosure. The structure of the wireless power transfer system 600 is similar to that shown in FIG. 2 except that the location of the harmonic notch circuit 106N is different. More particularly, the harmonic notch circuit 106N is connected between an impedance circuit and the primary resonant tank as shown in FIG. 6. It should be noted that the harmonic notch circuit 106N is designed to attenuate a harmonic having a frequency equal to the resonant frequency of Lh1 and Ch1. The impedance of the impedance circuit is not equal to zero at the resonant frequency of Lh1 and Ch1. In some embodiments, the impedance circuit may be part of a harmonic trap circuit, which will be described in detail below with respect to FIG. 8.

Figure 7:
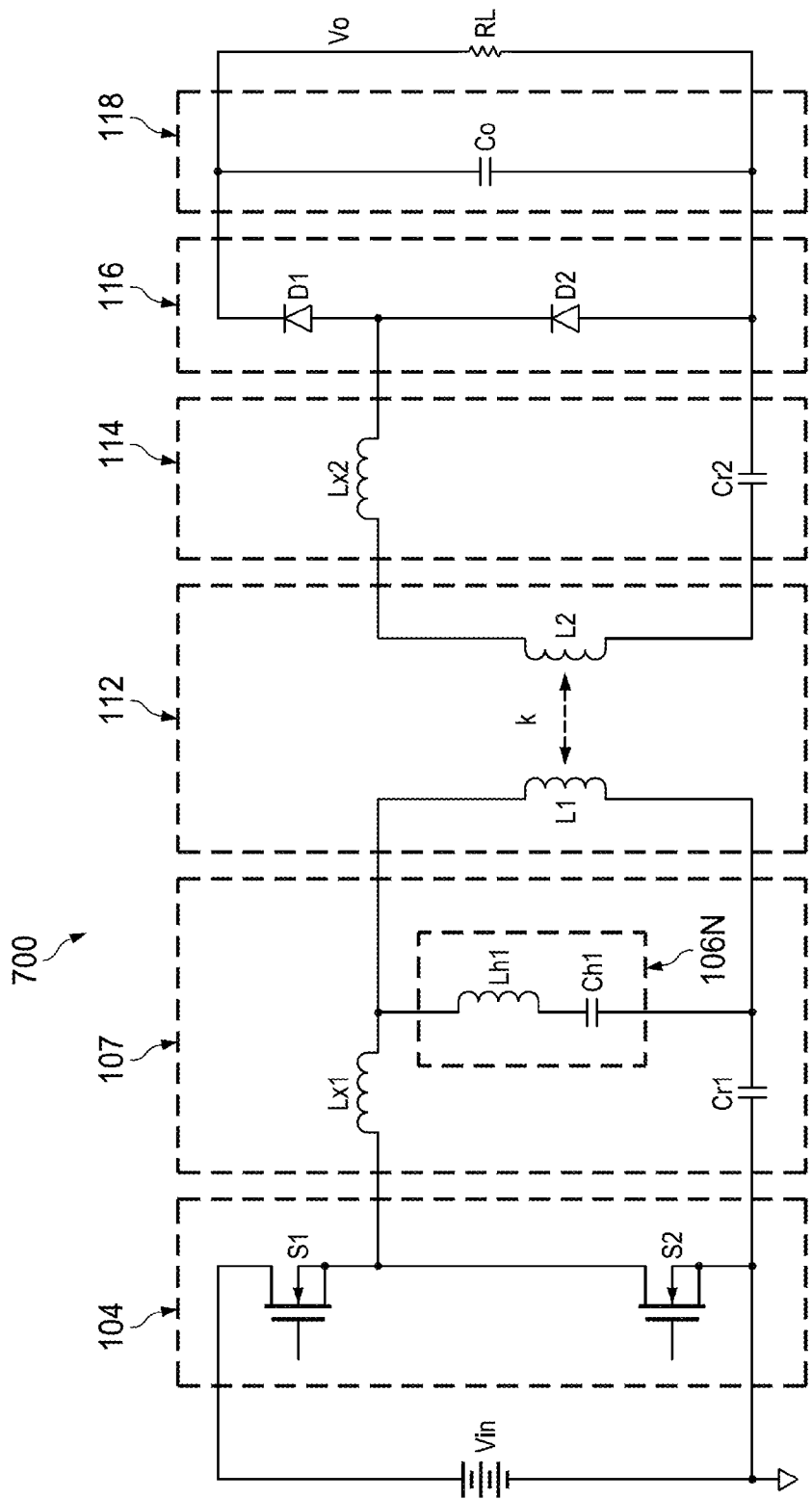
FIG. 7 illustrates a schematic diagram of a fifth illustrative implementation of the harmonic reduction apparatus shown in FIG. 1 in accordance with various embodiments of the present disclosure.

FIG. 7 illustrates a schematic diagram of a fifth illustrative implementation of the harmonic reduction apparatus shown in FIG. 1 in accordance with various embodiments of the present disclosure. The structure of the wireless power transfer system 700 is similar to that shown in FIG. 2 except that the location of the harmonic notch circuit 106N is different. More particularly, as shown in FIG. 7, the harmonic notch circuit 106N is connected between the primary resonant tank and the transmitter coil L1.

Figure 8:
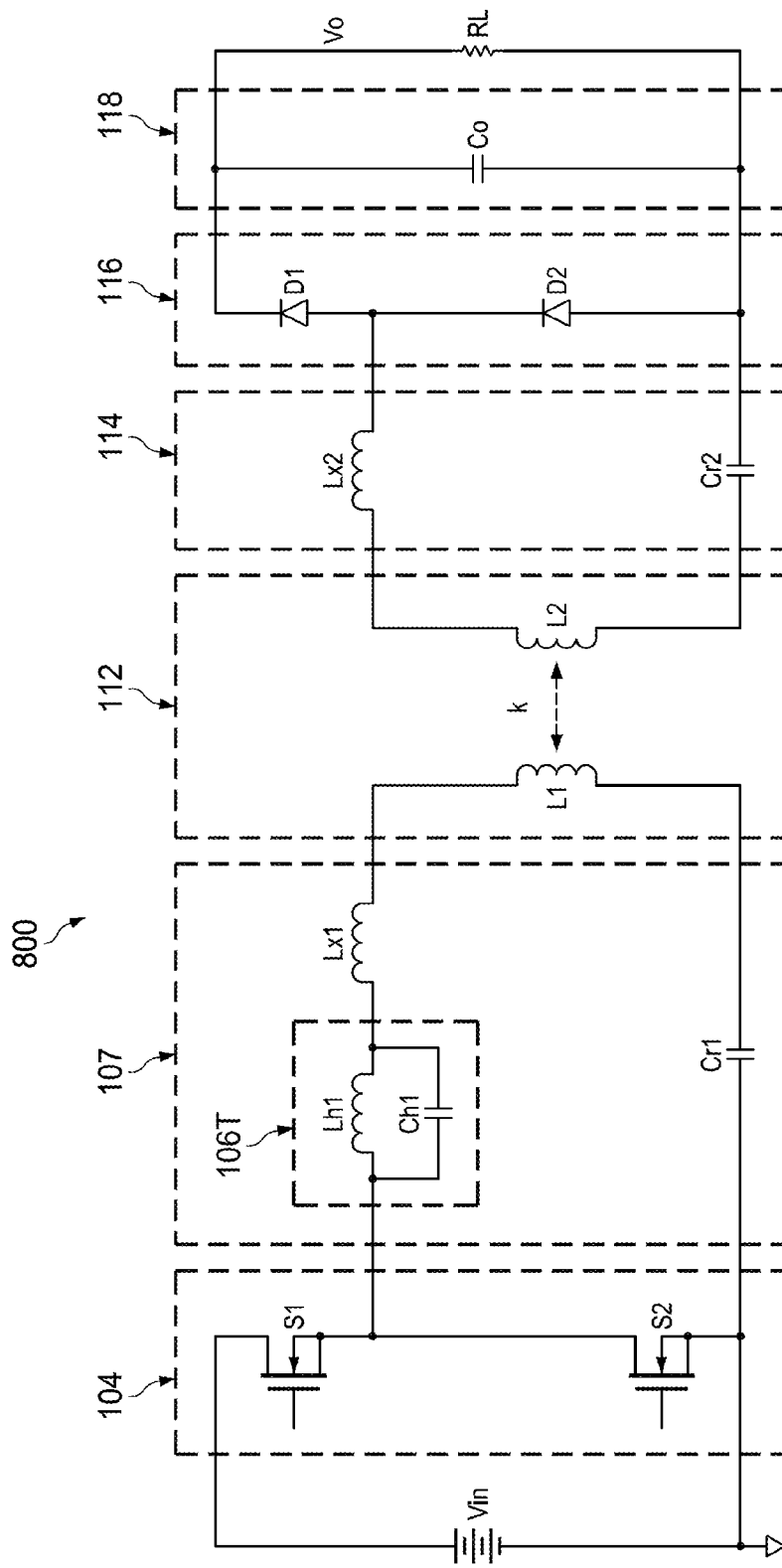
FIG. 8 illustrates a schematic diagram of a sixth illustrative implementation of the harmonic reduction apparatus shown in FIG. 1 in accordance with various embodiments of the present disclosure.

FIG. 8 illustrates a schematic diagram of a sixth illustrative implementation of the harmonic reduction apparatus shown in FIG. 1 in accordance with various embodiments of the present disclosure. The harmonic reduction apparatus shown in FIG. 8 is implemented as a harmonic trap circuit comprising an inductor Lh1 and a capacitor Ch1. Throughout the description, the harmonic trap circuit shown in FIG. 8 is alternatively referred to as the harmonic trap circuit 106T.

As shown in FIG. 8, the harmonic trap circuit 106T has a first terminal connected to a common node of the switching elements S1 and S2. The second terminal of the harmonic trap circuit 106T is connected to the first series resonant inductor Lx1. It should be noted, depending on design needs and different applications, the harmonic trap circuit 106T may comprise a resistor (not shown) connected in parallel with the inductor Lh1 and the capacitor Ch1. The resistor may be formed by the equivalent resistance of the inductor Lh1 and the capacitor Ch1. In alternative embodiments, the resistor may be implemented as a discrete resistor.

In operation, the values of the inductor Lh1 and the capacitor Ch1 are selected such that the inductor Lh1 and the capacitor Ch1 form a high impedance path for an undesired frequency component. In some embodiments, the switch network 104 operates at a switching frequency of 6.78 MHz. The harmonic trap circuit 106T is designed to attenuate the third order harmonic having a frequency of about 20.34 MHz. In other words, the inductor Lh1 and the capacitor Ch1 form a high impedance path for the third order harmonic so that the third order harmonic current is blocked from entering into the transmitter coil L1.

In some embodiments, the inductance of Lh1 is in a range from about 10 pH to about 10 nH. The capacitor of Ch1 is in a range from about 100 pF to about 10 nF. It should further be noted that the values given above are selected purely for demonstration purposes and are not intended to limit the various embodiments of the present invention to any particular values. A person skilled in the art will recognize that, depending on different application and design needs, the inductance and capacitance recited above may be changed to different values.

One advantageous feature of the harmonic trap circuit 106T shown in FIG. 8 is that the harmonic trap circuit 106T is capable of preventing unwanted harmonics (e.g., the third order harmonic) from entering the transmitter coil. As a result, the wireless power transfer system is able to satisfy the EMC regulations.

Figure 9:
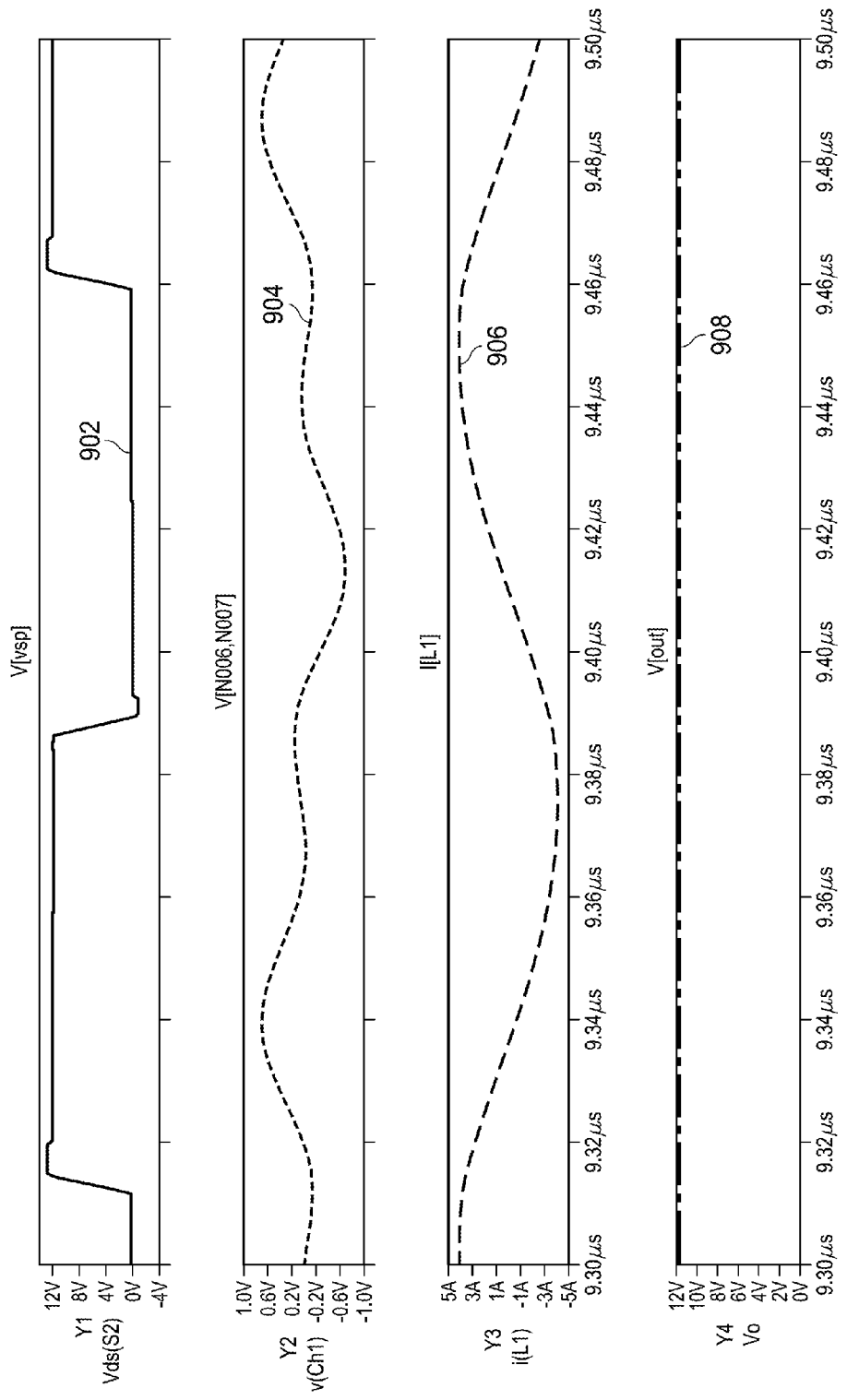
FIG. 9 illustrates waveforms of the wireless power transfer system shown in FIG. 8 in accordance with various embodiments of the present disclosure.

FIG. 9 illustrates various waveforms of the wireless power transfer system shown in FIG. 8 in accordance with various embodiments of the present disclosure. The horizontal axis of FIG. 9 represents intervals of time. The unit of the horizontal axis is micro second. There may be four vertical axes. The first vertical axis Y1 represents the voltage across the drain-to-source of the switch S2. The second vertical axis Y2 represents the current flowing through the capacitor Ch1. The third vertical axis Y3 represents the current flowing through the transmitter coil L1. The fourth vertical axis Y4 represents the output voltage of the wireless power transfer system 800.

As shown in FIG. 9, waveform 908 indicates the output voltage Vo is maintained at a desired value. Waveform 906 shows the current of the transmitter coil L1 is close to a sinusoidal waveform. The third order harmonic content of waveform 906 is relatively low because the third harmonic has been blocked from entering into the transmitter coil L1. Waveform 902 shows the switching frequency of the wireless power transfer system 800. Furthermore, waveform 902 indicates that both S1 and S2 have a zero voltage turn-on transition. Waveform 904 shows the current flowing through the harmonic trap circuit is mainly the third order harmonic current.

Figure 10:
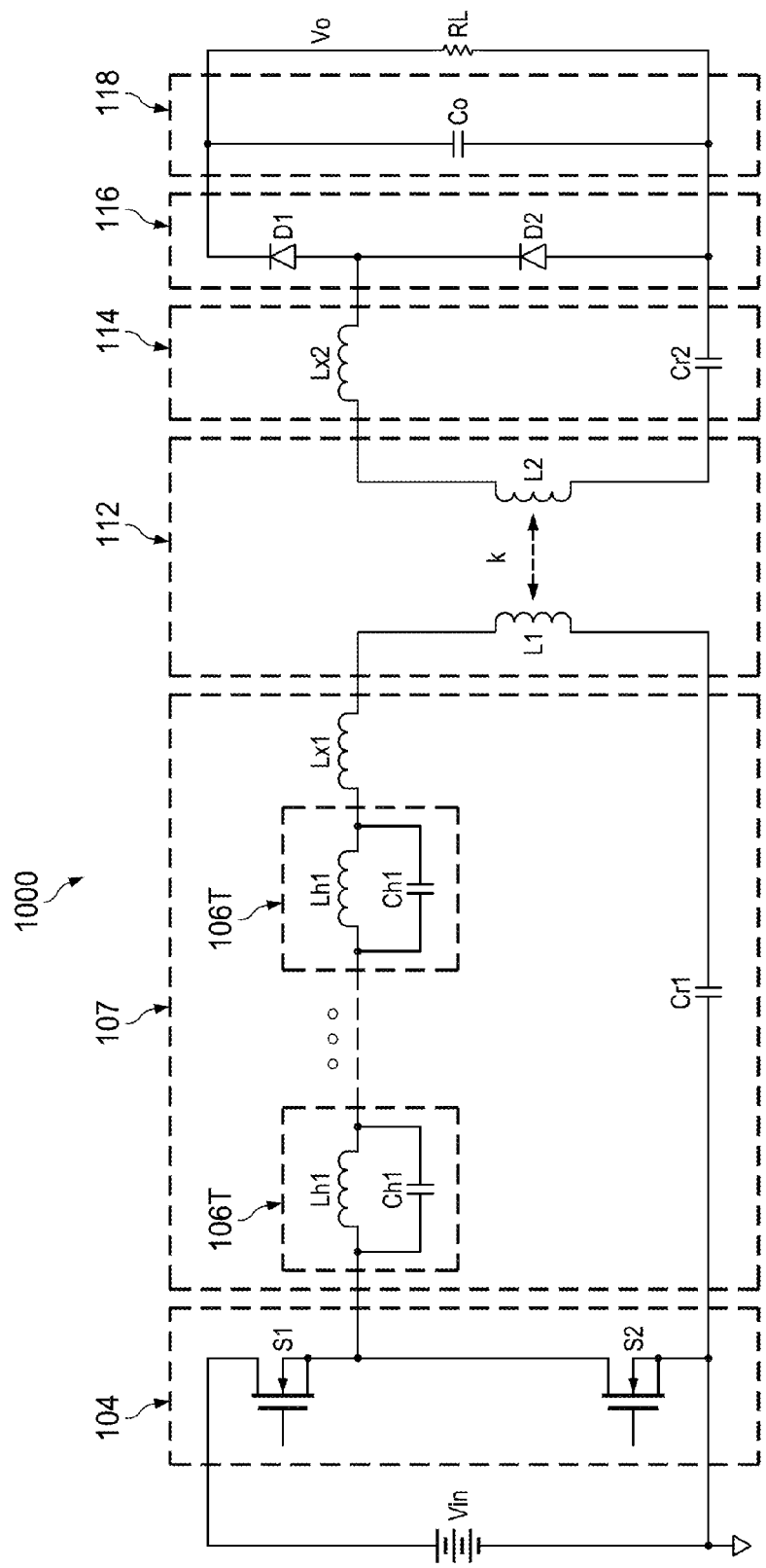
FIG. 10 illustrates a schematic diagram of a seventh illustrative implementation of the harmonic reduction apparatus shown in FIG. 1 in accordance with various embodiments of the present disclosure.

FIG. 10 illustrates a schematic diagram of a seventh illustrative implementation of the harmonic reduction apparatus shown in FIG. 1 in accordance with various embodiments of the present disclosure. The harmonic reduction apparatus of the wireless power transfer system 1000 shown in FIG. 10 is formed by a plurality of harmonic trap circuits 106T connected in series. In some embodiments, each harmonic trap circuit shown in FIG. 10 may be designed to prevent an odd order harmonic from entering into the transmitter coil L1. As a result, multiple odd order harmonics are attenuated and the current flowing through the transmitter coil L1 is of a sinusoidal waveform.

Figure 11:
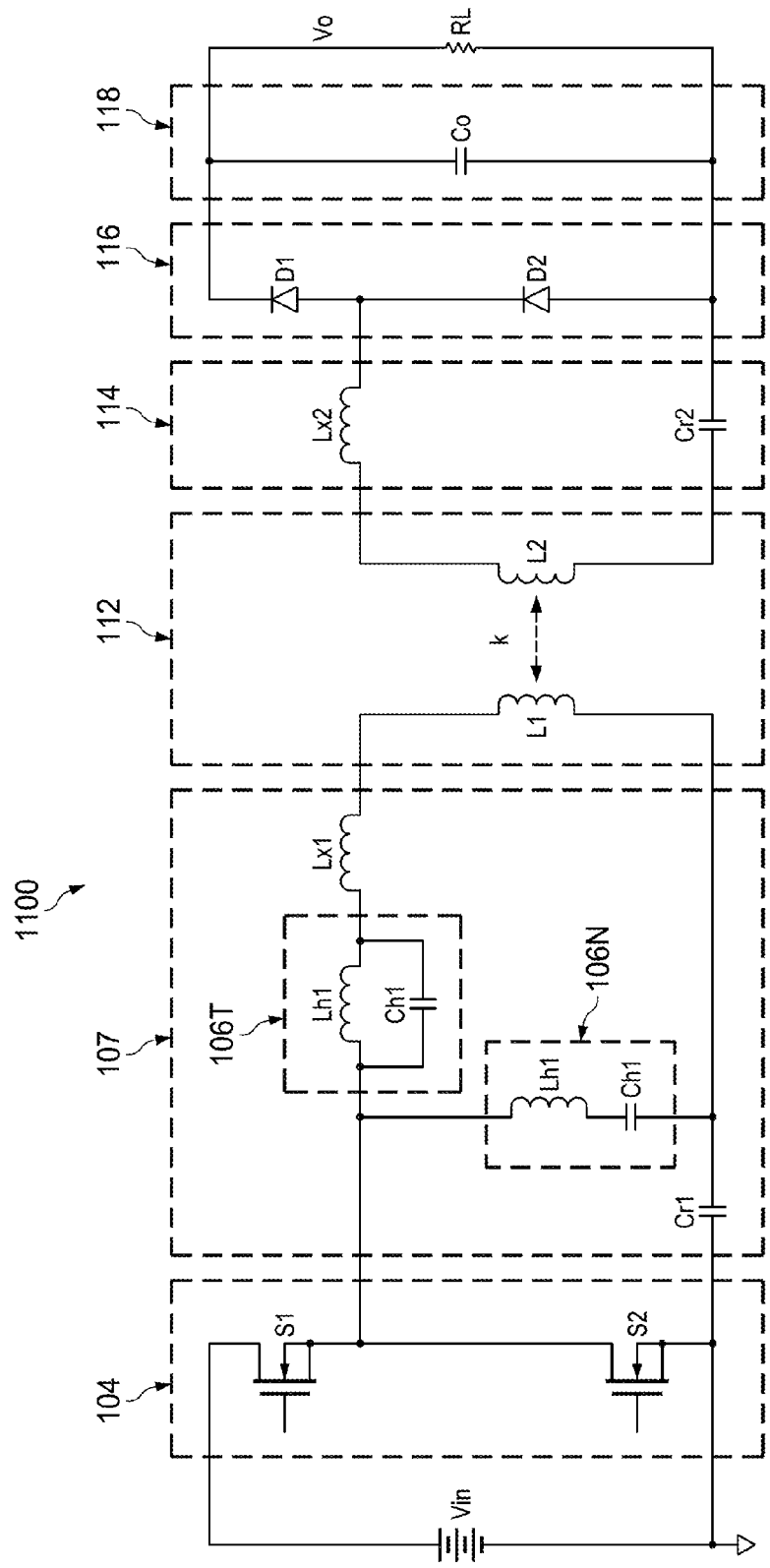
FIG. 11 illustrates a schematic diagram of an eighth illustrative implementation of the harmonic reduction apparatus shown in FIG. 1 in accordance with various embodiments of the present disclosure.

FIG. 11 illustrates a schematic diagram of an eighth illustrative implementation of the harmonic reduction apparatus shown in FIG. 1 in accordance with various embodiments of the present disclosure. The power conversion topology of the wireless power transfer system 1100 shown in FIG. 11 is similar to that shown in FIG. 2 except that the harmonic reduction apparatus is different. More particularly, the harmonic reduction apparatus shown in FIG. 11 includes both the harmonic notch circuit 106N shown in FIG. 2 and the harmonic trap circuit 106T shown in FIG. 8. In some embodiments, a harmonic notch circuit 106N provides a low impedance path for an undesired frequency component. On the other hand, a harmonic trap circuit 106T blocks the undesired frequency component from entering the transmitter coil L1. Such a combination of the harmonic notch circuit 106N and the harmonic trap circuit 106T helps to further reduce the undesired harmonic so that the wireless power transfer system 1100 is compliant with the EMC regulations. It should be noted that while FIG. 11 shows the harmonic notch circuit 106N is placed before the harmonic trap circuit 106T, other variations are within the scope of this disclosure. For example, the harmonic notch circuit 106N may be placed after the harmonic trap circuit 106T.

Figure 12:
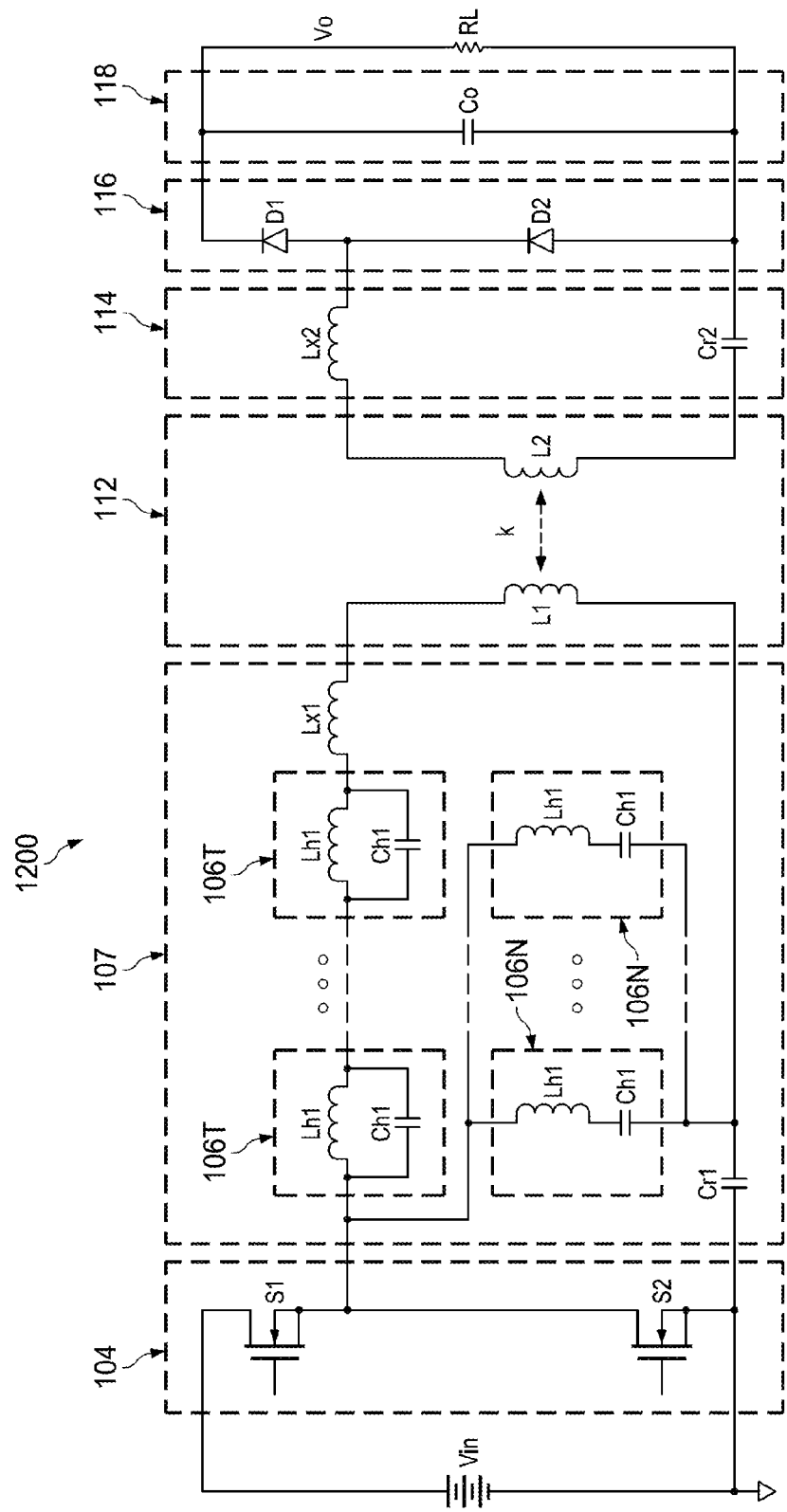
FIG. 12 illustrates a schematic diagram of a ninth illustrative implementation of the harmonic reduction apparatus shown in FIG. 1 in accordance with various embodiments of the present disclosure.

FIG. 12 illustrates a schematic diagram of a ninth illustrative implementation of the harmonic reduction apparatus shown in FIG. 1 in accordance with various embodiments of the present disclosure. The harmonic reduction apparatus of the wireless power transfer system 1200 shown in FIG. 12 is similar to that shown in FIG. 11 except that the single harmonic trap circuit 106T shown in FIG. 11 is replaced by a plurality of harmonic trap circuits 106T connected in series, and the single harmonic notch circuit 106N shown in FIG. 11 is replaced by a plurality of harmonic notch circuits 106N connected in parallel.

It should be noted that while FIG. 12 shows the harmonic notch circuits 106N are placed before the harmonic trap circuits 106T, other variations are within the scope of this disclosure. For example, the harmonic notch circuits 106N may be placed after the harmonic trap circuits 106T. Furthermore, the harmonic notch circuits 106N and the harmonic trap circuits 106T may be placed in an alternating manner.

In sum, a harmonic notch circuit (device) can be connected across the transmitter coil or across the primary resonant tank. Furthermore, the harmonic notch circuit can be coupled between the switching network and an internal node of the primary resonant circuit. In the arrangements above, a low impedance path for a harmonic frequency is created to reduce the voltage across the harmonic notch circuit at the harmonic frequency. As a result, the harmonic current at the harmonic frequency in the transmitter coil has been reduced. Similarly, a harmonic trap circuit (device) can be put in series with the transmitter coil, the primary resonant tank or anywhere where there is a series coupling relationship with the transmitter coil. Because the harmonic trap circuit provides a high impedance path for a chosen harmonic frequency, the harmonic current at the harmonic frequency in the transmitter coil has been reduced. A harmonic notch circuit and a harmonic trap circuit can also be advantageously combined to further reduce the harmonic content at a particular harmonic frequency.

The harmonic trap circuit and the harmonic notch circuit described above are a resonant circuit. Such a resonant circuit may increase the complexity of the system operation. Furthermore, it may cause excessive oscillation, and high voltage and current stresses to the components of a wireless power transfer system. More particularly, when there is a large signal transient such as a start-up process of the wireless power system, a suitable soft-start operation is required to address the issues caused by the resonant circuit.

Figure 13:
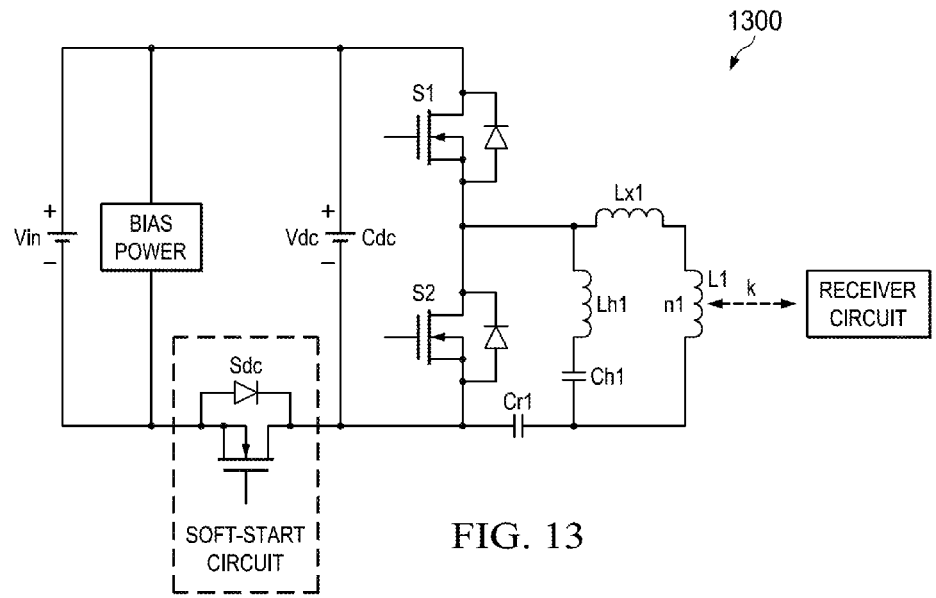
FIG. 13 illustrates a schematic diagram of a wireless power transfer system including a soft start circuit in accordance with various embodiments of the present disclosure.

FIG. 13 illustrates a schematic diagram of a wireless power transfer system including a soft start circuit in accordance with various embodiments of the present disclosure. As shown in FIG. 13, the input dc power source of the wireless power transfer system 1300 is not connected to the switch network directly. There is a dc-link switch Sdc coupled between the negative terminal of the input dc power source and the negative terminal of an input capacitor Cdc. During a soft start process, the gate control signal of the dc-link switch Sdc is so controlled that the dc-link switch Sdc is turned on slowly. Such a slow turn-on of the dc-link switch Sdc helps to limit the current flowing through the dc-link switch Sdc. As a result, the voltage Vdc shown in FIG. 13 rises slowly in a controllable manner.

The bias power is coupled to the input dc power source Vin. As a result, the bias power can be established before Vdc reaches a significant value. The bias power can be used to control the operation of the dc-link switch Sdc.

One advantageous feature of having the soft start circuit shown in FIG. 13 is the gradual and slow increase of Vdc helps to establish a smooth operation of the primary resonant tank. As a result, the component stresses of the wireless power transfer system 1300 are reduced.

Figure 14:
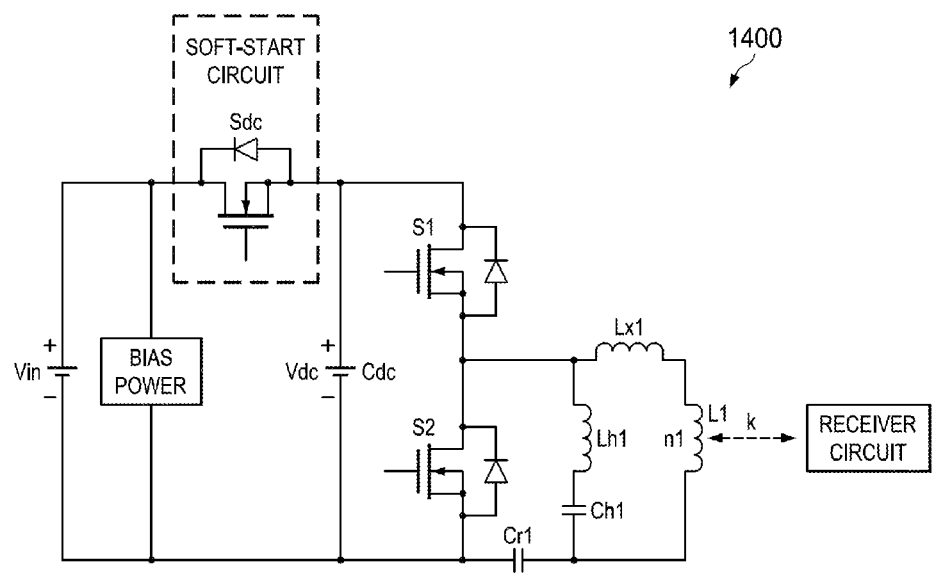
FIG. 14 illustrates a schematic diagram of another wireless power transfer system including a soft start circuit in accordance with various embodiments of the present disclosure.

FIG. 14 illustrates a schematic diagram of another wireless power transfer system including a soft start circuit in accordance with various embodiments of the present disclosure. The soft start circuit of the wireless power transfer system 1400 shown in FIG. 14 is similar to that shown in FIG. 13 except that the dc-link switch Sdc is coupled between the positive terminal of the input dc power source Vin and the positive terminal of an input capacitor Cdc.

Figure 15:
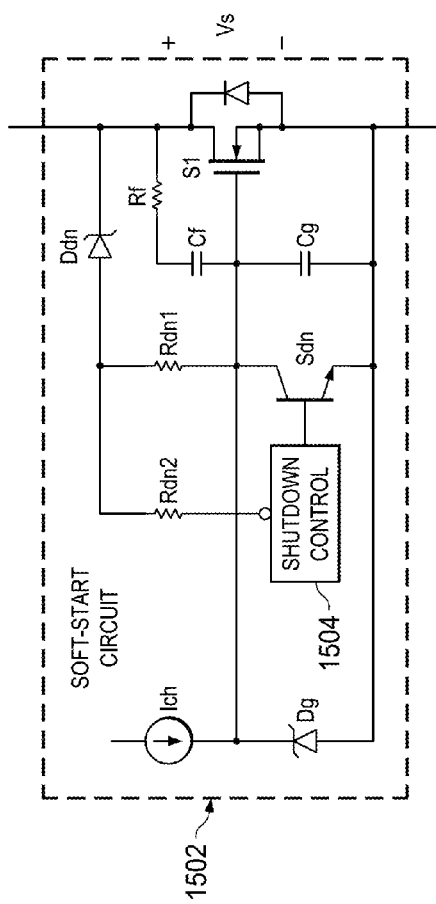
FIG. 15 illustrates a schematic diagram of a detailed implementation of the soft start circuit shown in FIG. 13 in accordance with various embodiments of the present disclosure.

FIG. 15 illustrates a schematic diagram of a detailed implementation of the soft start circuit shown in FIG. 13 in accordance with various embodiments of the present disclosure. S1 is the main dc-link switch (soft-start switch), which is designed to have a reliable linear mode operation during a startup process. After the startup process finishes, the dc-link switch S1 has a low on-resistance level after S1 is fully turned on. It should be noted that the transfer characteristics of S1 may be not very linear in consideration with the highly non-linear miller capacitance between the drain and the gate of S1.

The soft start circuit further comprises a feedback circuit formed by Cf and Rf. As shown in FIG. 15, Cf and Rf are connected in series and further coupled between the drain and the gate of S1. Cr and Rf are employed to compensate the variation of the miller capacitance so as to linearize the transfer characteristics of S1.

FIG. 15 further shows there is a capacitor Cg coupled between the gate and the source of S1. Cg can be the gate to source capacitance of S1, a discrete capacitor and/or any combination thereof.

The charge current of the gate of S1 can be controlled by adjusting the gate charging current source Ich. By controlling the shape of the gate charge current, the gate voltage can be controlled accordingly. As a result, the switch S1 can be turned on slowly and the voltage Vs is controlled to decrease slowly in an acceptable pattern.

The gate current source Ich can be generated by a resistor coupled to the input voltage source and/or any other suitable power sources such as a control operation amplifier. Alternatively, the gate current source Ich can be a current source coupled to the input voltage source and/or any other suitable power sources such as a controlled current source.

As shown in FIG. 15, Zener diode Dg is employed to limit the maximum voltage of the gate of S1. Sdn is a transistor and/or a MOSFET switch. Sdn is used to turn-off S1 when it is desired. The shutdown process of S1 starts when Sdn is turned on.

In some embodiments, the shut-down speed of S1 can be much faster than its turn-on speed. If the voltage Vs reaches a predefined value (the predefined value is lower than the avalanche voltage of S1) due to a voltage spike caused by inductance coupled to S1's main power path. Zener diode Ddn starts to conduct, and through a resistor Rdn2, a signal is coupled to the Shutdown Control block. The Shutdown Control block processes the signal and generates a signal to turn off Sdn. After Sdn is turned off or at least operates at a linear mode temporarily, through another resistor Rdn1, the gate voltage of S1 can be charged up so that S1 starts to conduct some current again. As a result, energy in the inductance coupled to S1 can be dissipated in S1.

In sum, this is a clamp operation to limit the stress of S1. As a result, the maximum voltage applied to S1 (drain-to-source) is reduced. Such a reduced voltage helps S1 not get into the avalanche mode operation or least reduce the avalanche energy.

Rdn1 and Rdn2 should be selected so that the drain voltage and drain current of S1 are within the safe region of S1. If desirable, Rdn1 and Rdn2 can also be coupled to additional Zener diodes to provide more flexibility. Similarly, a Zener-resistor combination can also be coupled to Ich to introduce another charging path, which can work in parallel with Rdn1 or completely replace Rdn1.

After the Vs drops below the clamp voltage of Zener diode Ddn, Sdn is turned on by signal generated by the Shutdown Control block to finish the shutdown process. This soft-start circuit and shutdown control mechanism can be applicable to any suitable power converters and/or power systems.

In a wireless power transfer system, a faulty condition may trigger a shutdown. The Shutdown Control block initiates a shutdown process. After the shutdown process finishes, the faulty condition has been cleared. The wireless power transfer system can be started again. The startup process may follow the soft-start mechanism described above with respect to FIG. 13.

The soft-start control mechanism shown in FIG. 13 can be used for other suitable application such as hot-swap. In a hot-swap process, the soft start circuit shown in FIG. 13 can be used to reduce the inrush current when a circuit is inserted into or connected to a power source. The soft-start circuit can be controlled to limit the current through the soft-start switch (the dc-link switch S1 in FIG. 15) to relatively low values during the first phase of the starting process during which the voltage across the switch is relatively high. In the second phase, after the switch voltage is reduced to a certain value and the system coupled to the soft-start circuit has a high enough voltage so it may start to work, the power source may need to provide more current. The switch S1 can be controlled so that the current flowing through the switch can be increased to meet the increased demand. By coordinating the switch voltage and current control, the stress of the switch S1 may be reduced. The reduced stress helps to improve the reliability and lower the cost.

All or part of the soft-start circuit can be integrated together as a semiconductor device. Moreover, the soft-start circuit can be integrated with the power conversion circuit such as the transmitter circuit shown in FIG. 13. It may not be practical to put a high value capacitor such as Cdc of FIG. 13 in a semiconductor die. Such a high value capacitor can be implemented as a discrete capacitor placed in parallel with a semiconductor capacitor which has a smaller value and is integrated inside the semiconductor die. If the interconnection inductance between these two capacitors (discrete capacitor and semiconductor capacitor) causes significant voltage ringing, a RC snubber or similar means can be used to reduce or dampen the ringing.

Figure 16:
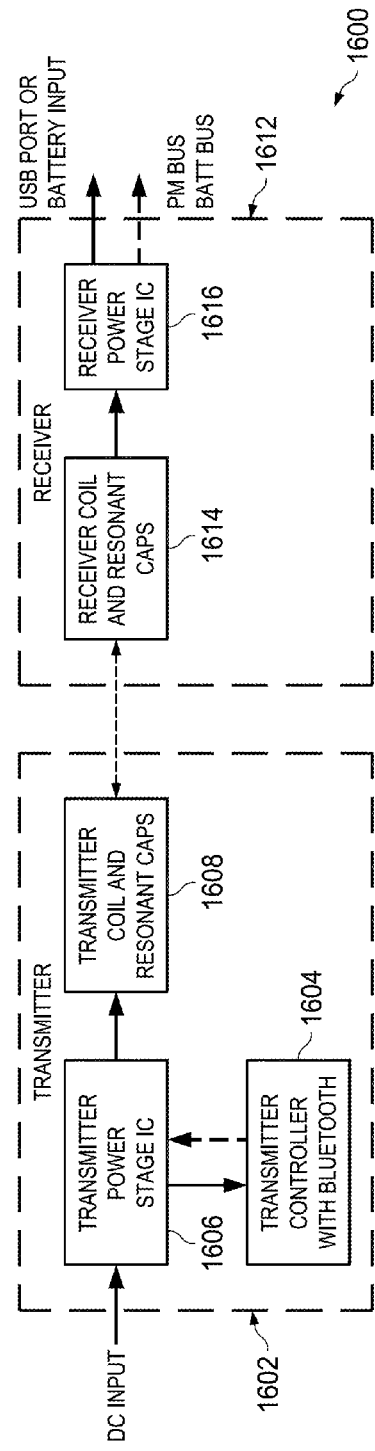
FIG. 16 illustrates a block diagram of a wireless power transfer system in accordance with various embodiments of the present disclosure.

FIG. 16 illustrates a block diagram of a wireless power transfer system in accordance with various embodiments of the present disclosure. The wireless power transfer system 1600 comprises a transmitter 1602 and a receiver 1612. The transmitter 1602 comprises a transmitter power stage IC 1606, a transmitter coil and resonant capacitor block 1608, and a transmitter controller 1604. The receiver 1612 comprises a receiver coil and resonant cap block 1614, and a receiver power stage IC 1616.

The transmitter power stage IC 1606 may comprise power switches, drive circuits, and basic power conversion control circuits. The transmitter power stage IC 1606 may also provide bias power to the transmitter controller 1604 if needed. Optionally, the transmitter power stage IC 1606 may comprise all or part of the resonant capacitors and its control circuit and drive circuit. For example, the output voltage control may be implemented through controlling the resonant capacitance.

The transmitter controller 1604 provides various control functions such as the system control function, the communication function and/or the like. The communication function can be implemented as a modulation process attached to the main power transfer process. Alternatively, the communication function may be carried out through a communication channel such as Bluetooth, WIFI, Zigbee, $I^2C$ etc. The external communication may not be very reliable. In case active communication signals have been sent and are not confirmed for a relatively long time, the power conversion may be shut down to save energy and prevent unwanted conditions.

The resonant capacitors in the transmitter 1602 may be controlled by a voltage shifting mechanism, which allows part of the capacitors to be exposed to only positive voltages. As a result, variable capacitance can be achieved by controlling a voltage and/or by switching unidirectional switches.

In the receiver circuit, the communication can be established by modulating a signal attached to the main power transfer process, or by transferring the signal through a power management bus, a battery management/control bus, or other suitable methods such as $I^2C$, Bluetooth, Wi-Fi etc.

The receiver power stage IC 1616 may have its own bias power circuit, and optionally provide bias power to other function units. Furthermore, the receiver power stage IC 1616 may receive bias power from the system such as a battery or a converter of the wireless power transfer system. All or part of the resonant capacitors in the receiver circuit may be integrated with the receiver power stage IC 1616. The voltage shifting mechanism described above may be applied to the resonant capacitors in the receiver. As a result, variable capacitance can be achieved by controlling a voltage or by switching unidirectional switches.

It should be noted that while a dc input is illustrated in FIG. 16, ac inputs or other power sources can be used too. For example, the power from an ac input can be utilized by connecting an appropriate power conversion circuit between the ac input source and the power stage IC.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
   a switch network coupled to a power source, wherein the switch network comprises a plurality of power switches;
   a primary resonant tank coupled to the plurality of power switches, wherein the primary resonant tank comprises at least a resonant capacitor;
   a transmitter coil coupled to the primary resonant tank, wherein:
      the transmitter coil is configured to be magnetically coupled to a receiver coil; and
      the transmitter coil and the receiver coil are configured such that wireless power is transferred from the transmitter coil to the receiver coil; and
   a harmonic reduction apparatus coupled between the switch network and the transmitter coil, wherein the harmonic reduction apparatus comprises a magnetic element and a capacitive element connected in series and further diagonally connected between an input terminal of the primary resonant tank and an output terminal of the primary resonant tank, and wherein the harmonic reduction apparatus is configured to:
      attenuate at least one undesired frequency component of a current in the transmitter coil.

2. The system of claim 1, wherein the harmonic reduction apparatus comprises:
   a first harmonic notch circuit comprising a first inductor and a first capacitor connected in series.

3. The system of claim 2, wherein:
   the first harmonic notch circuit is coupled to the transmitter coil.

4. The system of claim 2, wherein:
   the first harmonic notch circuit is connected to the switch network through the resonant capacitor of the primary resonant tank.

5. The system of claim 2, wherein:
   the first harmonic notch circuit is coupled between the switch network and a node inside the primary resonant tank.

6. The system of claim 2, further comprising:
   a second harmonic notch circuit comprising a second inductor and a second capacitor connected in series, wherein the first harmonic notch circuit and the second harmonic notch circuit are connected in parallel, and wherein:
      the first inductor and the first capacitor are configured to attenuate a first undesired frequency component; and
      the second inductor and the second capacitor are configured to attenuate a second undesired frequency component.

7. The system of claim 1, wherein the harmonic reduction apparatus comprises:
   a first harmonic trap circuit comprising a third inductor and a third capacitor connected in parallel.

8. The system of claim 7, wherein:
   the first harmonic trap circuit is connected in series with the transmitter coil.

9. The system of claim 7, wherein:
   the first harmonic trap circuit is connected in series with the primary resonant tank.

10. The system of claim 7, wherein:
    the first harmonic trap circuit is coupled between the switch network and a node inside the primary resonant tank.

11. The system of claim 7, further comprising:
    a second harmonic trap circuit comprising a fourth inductor and a fourth capacitor connected in parallel, wherein the first harmonic trap circuit and the second harmonic trap circuit are connected in series, and wherein:
       the third inductor and the third capacitor are configured to attenuate a third undesired frequency component; and
       the fourth inductor and the fourth capacitor are configured to attenuate a fourth undesired frequency component.

12. The system of claim 1, wherein the harmonic reduction apparatus comprises:
    a first series harmonic reduction device and a first parallel harmonic reduction device, and wherein:
       the first series harmonic reduction device is coupled between the switch network and the primary resonant tank; and
       the first parallel harmonic reduction device is coupled between a common node of the first series harmonic reduction device and the switch network, and a common node of the primary resonant tank and the switch network.

13. The system of claim 1, wherein the harmonic reduction apparatus comprises:
    a first series harmonic reduction device and a first parallel harmonic reduction device, and wherein:
       the first series harmonic reduction device is coupled between the switch network and the primary resonant tank; and
       the first parallel harmonic reduction device is coupled between a common node of the first series harmonic reduction device and the switch network, and a node inside the primary resonant tank.

14. The system of claim 1, wherein the harmonic reduction apparatus comprises:
    a first series harmonic reduction device and a first parallel harmonic reduction device, and wherein:
       the first series harmonic reduction device is coupled between the switch network and the primary resonant tank; and the first parallel harmonic reduction device is connected with the transmitter coil through the primary resonant tank.

15. The system of claim 1, wherein the harmonic reduction apparatus comprises:
a first series harmonic reduction device and a first parallel harmonic reduction device, and wherein:
the first series harmonic reduction device is coupled between the first parallel harmonic reduction device and the primary resonant tank; and
the first parallel harmonic reduction device is coupled to a common node of an impedance circuit and the switch network.

16. A device comprising:
a switch network coupled to a power source, wherein the switch network comprises a plurality of power switches;
a transmitter resonant tank coupled to the plurality of power switches, wherein the transmitter resonant tank comprises a primary resonant capacitor;
a transmitter coil coupled to the transmitter resonant tank; and
a harmonic reduction apparatus coupled between the switch network and the transmitter coil, wherein the harmonic reduction apparatus comprises a first harmonic reduction circuit diagonally connected between an input terminal of the transmitter resonant tank and an output terminal of the transmitter resonant tank, and a second harmonic reduction circuit connected in series with primary resonant capacitor, and wherein the harmonic reduction apparatus is configured to attenuate at least one undesired frequency component of a current in the transmitter coil.

17. The device of claim 16, wherein:
the harmonic reduction apparatus comprises a plurality of harmonic trap circuits.

18. The device of claim 16, wherein:
the harmonic reduction apparatus comprises a plurality of harmonic notch circuits.

19. A device comprising:
a switch network coupled to a power source through an input capacitor, wherein the switch network comprises a plurality of power switches;
a transmitter resonant tank coupled to the plurality of power switches, wherein the transmitter resonant tank comprises a primary resonant capacitor;
a transmitter coil coupled to the transmitter resonant tank for transferring power to a receiver coil;
a harmonic reduction apparatus comprising a plurality of harmonic notch circuits and a plurality of harmonic trap circuits; and
a soft start switch coupled between the power source and the input capacitor.

20. The device of claim 19, wherein:
the soft start switch is configured to damp the resonance of the transmitter resonant tank and the harmonic reduction apparatus during a start-up process; and
the soft start switch is controlled by a feedback signal generated based upon a drain voltage of the soft start switch.

\* \* \* \* \*